(12) United States Patent
Hines et al.

(10) Patent No.: US 8,095,874 B2
(45) Date of Patent: Jan. 10, 2012

(54) INPUTTING DATA ON A PORTABLE COMPUTING DEVICE

(75) Inventors: Michael Frederick Hines, Sammamish, WA (US); Michael F. Koenig, Bellevue, WA (US); Tara Prakriya, Redmond, WA (US); Subha Bhattacharyay, Bellevue, WA (US); Anuraag Tiwari, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 767 days.

(21) Appl. No.: 12/117,305

(22) Filed: May 8, 2008

(65) Prior Publication Data
US 2009/0282330 A1    Nov. 12, 2009

(51) Int. Cl.
*G06F 17/28* (2006.01)
*G06F 3/033* (2006.01)
(52) U.S. Cl. ......... 715/268; 715/243; 715/276; 715/863
(58) Field of Classification Search .................. 715/243, 715/268, 276, 863
See application file for complete search history.

(56) References Cited

U.S. PATENT DOCUMENTS

| | | | |
|---|---|---|---|
| 5,627,349 A | 5/1997 | Shetye et al. | |
| 5,737,740 A | 4/1998 | Henderson et al. | |
| 5,869,789 A | 2/1999 | Reid-Green | |
| 6,055,552 A | 4/2000 | Curry | |
| 6,259,043 B1 | 7/2001 | Clary et al. | |
| 6,504,956 B1 | 1/2003 | Gannage et al. | |
| 6,867,765 B2 | 3/2005 | LeKuch et al. | |
| 7,102,628 B2 | 9/2006 | LeKuch et al. | |
| 2002/0041290 A1 | 4/2002 | LeKuch et al. | |
| 2004/0165232 A1* | 8/2004 | Chiba et al. | 358/498 |
| 2005/0013104 A1* | 1/2005 | Feague et al. | 361/683 |
| 2006/0007189 A1* | 1/2006 | Gaines et al. | 345/179 |
| 2008/0012839 A1* | 1/2008 | Feague et al. | 345/179 |

OTHER PUBLICATIONS

Ronald L. Machado, "An Introduction to Tablet PCs", Family Practice Management, Oct. 2004, pp. 36-38.
Cortes, et al., "Mobile Internet Wireless Connectivity Used in the Business World: Data Network PC Card, BlackBerry, and Tablet PC", Fall 2006, pp. 1-16.

* cited by examiner

*Primary Examiner* — Tadeese Hailu

(57) ABSTRACT

A method for displaying input from a portable computing device on a second computing device is described. Later inputs on the portable computing device are displayed in a scrolling fashion on the second computing device with later input being displayed below previous input without regard to the location of the input on the portable computing device.

20 Claims, 5 Drawing Sheets

INPUTTING DATA ON A PORTABLE COMPUTING DEVICE

BACKGROUND

This Background is intended to provide the basic context of this patent application and it is not intended to describe a specific problem to be solved.

Portable computing devices have proven to be useful to consumers. From cell phones to music players, the ability to carry a portable computing device has improved consumers' lives and made them more productive. Inputting data to computing devices has been a challenge. Consumers are accustomed to have computer applications attempt to mimic paper and pencil by creating virtual pages and tracking a user's progress through a document by tracking the virtual page which the user is on. Translating the virtual page to a portable computing device with a much smaller screen has been a challenge. Users often get confused as a full screen on a portable computing device rarely translates into a virtual page. A user may think they are on a third page on the portable computing device but in reality, the user may be on the first virtual page as virtual pages are longer than the display on the portable computing device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of displaying inputted data from a portable computing device on a second computing device is disclosed. On the second computing device, an input is received from the portable computing device at an input location at a first time. The input is displayed at a display location on the second computing device wherein the display location is below any other input displayed previously communicated without regard to the input location. The method is repeated such that later received inputs are displayed on the second computing device below previously received inputs without regard to the location at which the input was entered on the portable computing device.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describ-ing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by recit-ing the word "means" and a function without the recital of any structure, it is not intended that the scope of any claim element be interpreted based on the application of 35 U.S.C. §112, sixth paragraph.

Figure 1:
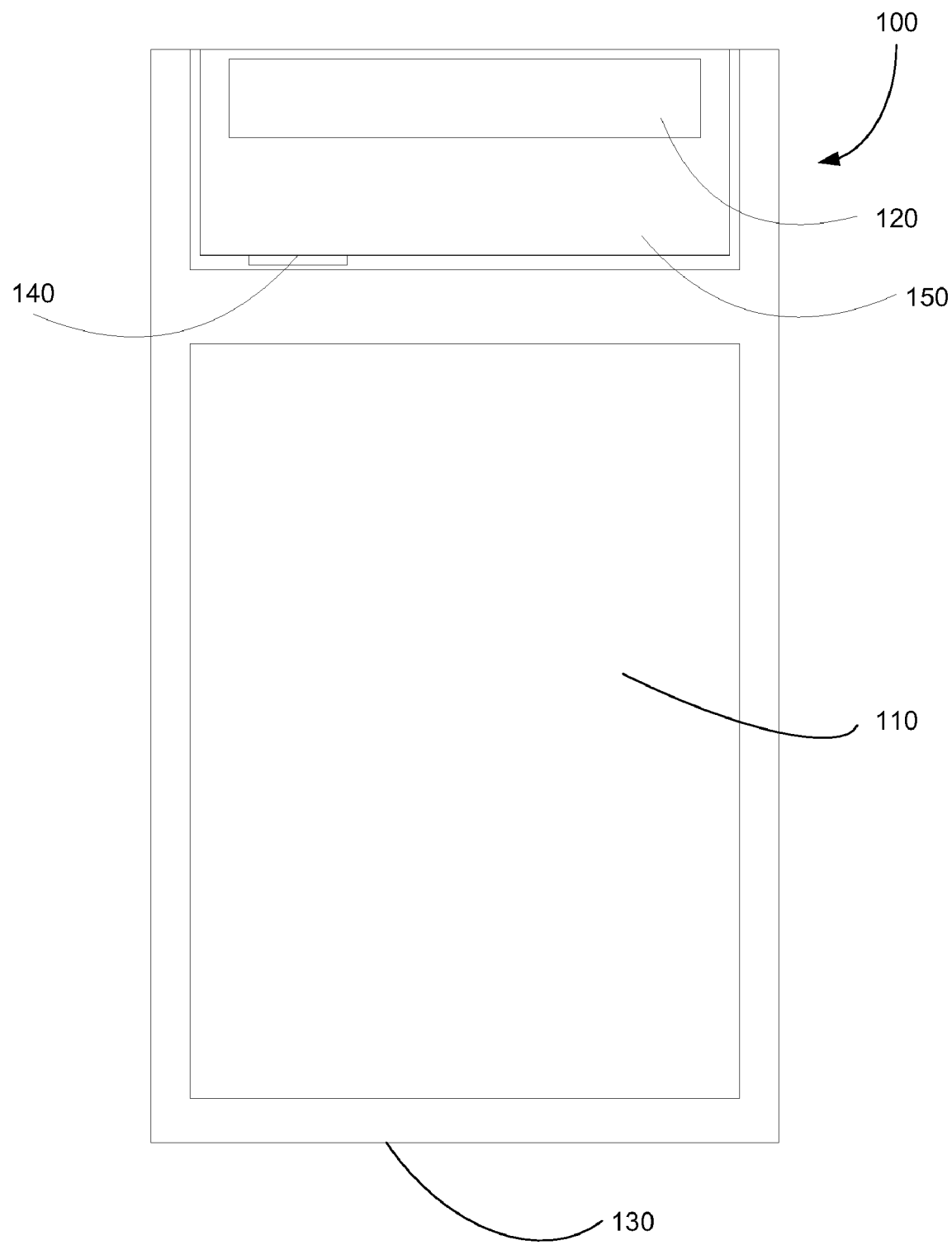
FIG. 1 is an illustration of a portable computing device.

FIG. 1 may be an illustration of a portable computing device 100. Portable computing devices 100 may be adapted to store and play a variety of file types such music files (for example, wav files, mp3 files, etc.), video files (for example, wav files, mpeg files, mpeg4 files, etc.), photo files (for example, jpeg, gif, etc.) or any other type of electronic data file. Music files are not just traditional music files but also may include podcasts, voice recordings, audio books, etc. The devices 100 may also have an FM radio, an AM radio, a satellite receiver or a TV tuner to receive broadcasts from a variety of sources. Additional features are certainly available such as a WiFi ability, ability to transmit music, photos or video to another device, ability to record voices, ability to take photos or videos, ability to make telephone calls, ability to accept GPS signals and calculate locations, ability to play video games, keep calendars, keep contacts, take notes, etc. The device 100 may an input area 110. The device 100 may also have a display 120.

In some embodiments, the device 100 may be separable into two portable devices. A first portable device 130 may include the input area 110 and an interface 140 for a second portable device 150. The second portable device 150 may contain a display 120 and an interface 140 to communicate with the first portable device 130. The second portable device 150 may contain a processor, the first portable device 130 may contain a processor or both may contain a processor.

Figure 2:
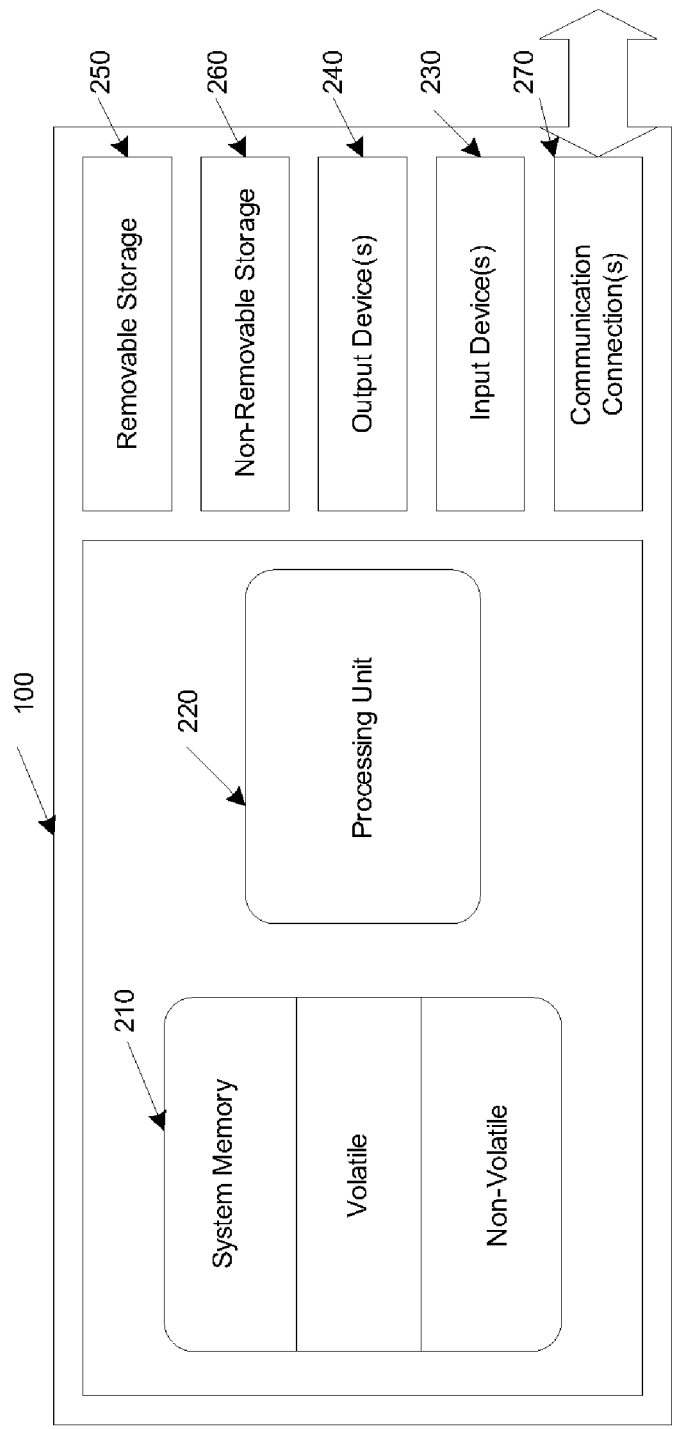
FIG. 2 is an illustration of computing elements in the portable computing device.

FIG. 2 may be an illustration of the hardware used in the portable computing device 100. The device 100 may have a memory 210, a processing unit 220, an input area 230 such as the input area 110 (FIG. 1), an output device 240 such as a display 150 (FIG. 1) and a power source (not shown). The memory 210 may be volatile (such as RAM), non-volatile (such as ROM, flash memory, etc.) or some combination of the two.

The device 100 may also include additional storage (removable and/or non-removable) including, but not limited to, magnetic or optical disks or tape or any other memory that can be easily rewritten, may keep data for long periods of time when power is removed and may allow quick and efficient access to data. Such additional storage is illustrated in FIG. 2 by removable storage 250 and non-removable storage 260. Computer storage media includes volatile and nonvolatile, removable and non-removable media implemented in any method or technology for storage of information such as computer readable instructions, data structures, program modules or other data. Memory 210, removable storage 250 and non-removable storage 260 are all examples of computer storage media. Computer storage media includes, but is not limited to, RAM, ROM, EEPROM, flash memory or other memory technology. Any such computer storage media may be part of device 100.

The processing unit 220 may be any processing unit 220 capable of executing computer code to decode data from a compressed format into a useable form fast enough such that music and video may be played continuously without skips or jumps. It may also be useful if the processor 220 is efficient in using power to increase the life of the power source. The device 100 may also contain communications connection(s) 270 that allow the device 100 to communicate with other devices. Communications connection(s) 270 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The power source may be a battery that may be rechargeable. The power source may also be a standard battery, an input from a power converter or another portable power source. The display 120 may be a color LCD screen or other display type that fits inside the device 100.

Figure 3:
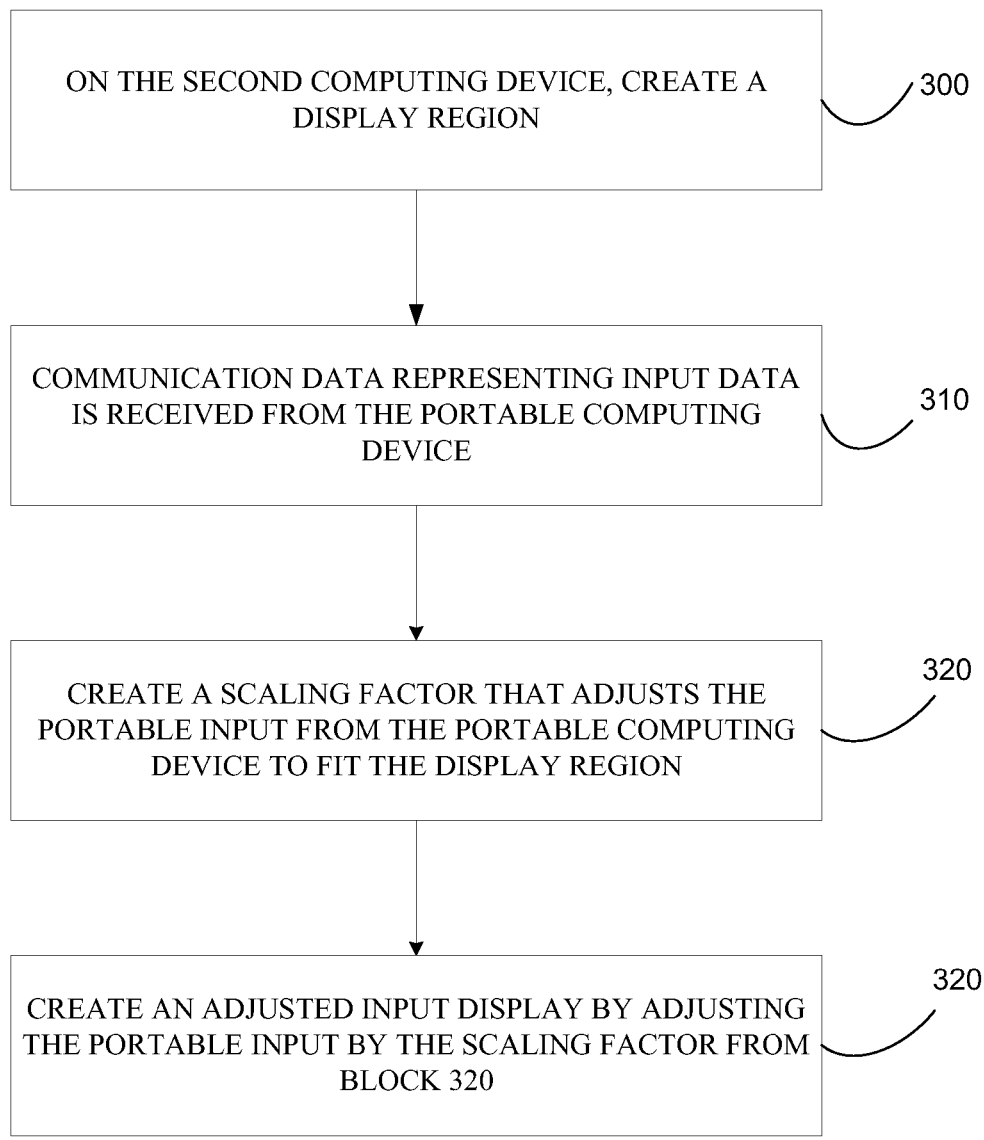
FIG. 3 is an illustration of a method of inputting data on a portable computing device.

FIG. 3 may illustrate a method of displaying inputted data from a portable computing device such as the device(s) 100 described in FIGS. 1 and 2 on a second computing device. The device(s) 100 may be virtually any device that has a processor 220, a memory 210 and a display 120 as described in FIGS. 1 and 2 and may be configured to execute computer executable instructions. The device(s) 100 may also be portable in that it may have a power source independent of the traditional power grid, such as a battery and may be of a size and weight that it can easily be carried.

At block 300, an input from a portable computing device (e.g., device(s) 100) at an input location may be received by a second computing device. The input may take on a virtually endless number of forms. By way of example and not limitation, in some examples, the input is notes handwritten on an input area on the portable computing device. In other examples, the input is a drawing and in yet other instances, a file of virtually any type such as a video file or audio file may be the input. In addition, the portable computing device may have an input circuit to access memory devices that may contain files that may be used as inputs or the portable computing device may have wireless communication capabilities such that files may be retrieved from a variety of sources.

In one embodiment, an input area of the portable computing device (e.g., the input area 120 of device(s) 100) is a touch sensitive input area that is widely commercially available. The touch sensitive input area may be capacitive devices that respond to touches from a stylus, a pen, a finger or any other appropriate pointing device. In another embodiment, the input area is a writing surface and is in communication with a writing instrument such that when the writing instrument passes over the writing surface, even on or through a stack of paper, the writing or drawing input is obtained and stored. Of course, other methods of digitizing the input are possible and are contemplated.

The input area may take the input and digitize it or turn it into a digital representation of the input. In one embodiment, the input area may turn the input into a series of x,y coordinates to indicate where the input was received. In another embodiment, character recognition software may be used on the input and recognized characters may be communicated as ASCII code. Of course, other ways of digitizing the input are possible and are contemplated.

The input itself may be received in a variety of forms. In one embodiment, the input may be digitized and communicated from the portable computing device as soon as received. In another embodiment, an input begin signal is received from the portable computing device at the second computing device. The input begin signal may be an input that continues for an input threshold amount of time. In action, the input begin signal may be when a user puts the pen to the input area for the input threshold amount of time. The threshold amount of time may be a time longer than a touch, such as when a user begins to write or draw rather than a mere tap or brush on the input area.

The input from the portable computing device may be stored in a memory in the portable computing device. The input may then be periodically communicated to the second computing device or it may be stored in the memory in the portable computing device until an input end signal from the portable computing device. The timing of the communication may be adjustable by a user. For example, a user may desire there to be minimal delay in time from entering an input on the portable computing device to the second computing device. In such cases, the period for communicating the input may be reduced. In other cases, the user may desire for an entire thought or page to be completed before communication begins and in these cases, the input may be communicated only when an input end signal is generated.

The input end signal may be an input that stops for a stop threshold amount of time. The stop threshold amount of time may be a period of time when an input stops, such as when a user picks up the pen for a threshold amount of time from the input area. In another embodiment, the input end signal may be selected by a user. The time period for an input end signal may also be adjusted by a user.

The form of the communication of the input may also be in a variety of forms. In one embodiment, the input may be translated into Remote Network Device Interface Specification (RNDIS) information and may be communicated via User Datagram Protocol (UPD) packets where the UPD packets include the RNDIS information. Of course, other formats are possible and are contemplated.

At block 310, the input may be displayed at a display location on the second computing device wherein the display location is below any other displayed input previously communicated without regard to the input location. In one embodiment, the input may be displayed on the second computing device when the input end signal is received. A space may be added after the displayed input such that subsequent inputs will be displayed below the previous input and the inserted space.

In another embodiment, on the second computing device, the input may be displayed in a scrolling fashion where later inputs are displayed after previous inputs without regard to the location of the input on the input area in communication with the portable computing device. In one example, a first input is entered at a first input location at a first time. On the second computing device, the input at the first input location is displayed at a first display location. A second input is entered at a second input location at a second time where the second time is after the first time. Note that the second input location is higher on the input pad than the first input location. On the second computing device, the input from the second input location is displayed at a second display location which is under the first display location. A third input is entered at a third input location at a third time when the third time is after the second time. Note that the third input location is below both the first input location and the second input location. On the second computing device, the input from the third location is displayed at a third display location where the third display location is under the first and second display locations.

The scrolling display of received input data may carry over into more situations. By example and not limitation, the first input location may be on a first piece of paper in communication with the input area and the second input location may be an entirely different piece of paper written or drawn upon at a later time. For example, a spiral notebook of paper may be in communication with the input area. The first input location may be on a first page in the spiral notebook. The page in the notebook may be turned and then the second input location may be on a second piece of paper in the same notebook. The second piece of paper may be before or after the first piece of paper. The first input received may be displayed on the second computing device as being higher than the second input received at a later time without regard to where the second input location was in relation to the first input location.

At block 320, the method may repeat. In this way, inputs received later in time will be displayed on the second computing device below those received earlier without regard to the location or page on which the input was originally entered. In this way, a user of the portable computing device will not have to memorize on which page a note was entered or to flip pages (either manually or electronically) to avoid writing over previously entered text. The newly entered input will simply be entered at the end of the electronic scroll, greatly simplifying using a digitizer to communicate input.

In one embodiment, the user may be able to maneuver the display on the second computing device to specifically select a location for an input from the portable computing device to be displayed. For example, a user may want to add a drawing to an input of text previously entered. The user may move a curser on the second computing device and place the curser at the desired display location. In another embodiment, the user may use a drop down menu to indicate a new desired display location for the input. An input may then be received from the portable computing device and be displayed at the selected display location on the second computing device. The user then may have the option for additional inputs to be inserted at the desired display location or be inserted at the end of the display on the second computing device.

Once the input is received at the second computing device, it may be stored. The stored file may take on a variety of formats. In one embodiment, the file may be kept as a bitmap file and stored in a file format appropriate for illustrations such as jpeg or bmp files. In another embodiment, a character recognition process may review the input and the file may be stored as a combination of text and images. Of course, a variety of file formats are contemplated.

The described method may have a variety of advantages. In previous systems, when a user flipped a page in a notebook in communication with the input area, the user also had to press a button to flip an electronic page on the second computing device. If the user forgot to press a button to flip the electronic page, the additional input on the next page of the notebook would be entered directly over the input previously displayed. For example, input 400 entered on the first page of a notebook near the top of the notebook page would be displayed at the top of the display on the second computing device. If a user turned the physical paper page in the notebook and started to write on the second page near the top, this input would be written directly over the previous input on the first physical page. When entering input on the portable computing device, it is no longer necessary to match the electronic page with the physical page as all inputs are displayed below the previous inputs. The present method continually scrolls the inputs such that later inputs do not write over previous inputs. The result is easier and more efficient input of data from a portable computing device to a second computing device.

Figure 4:
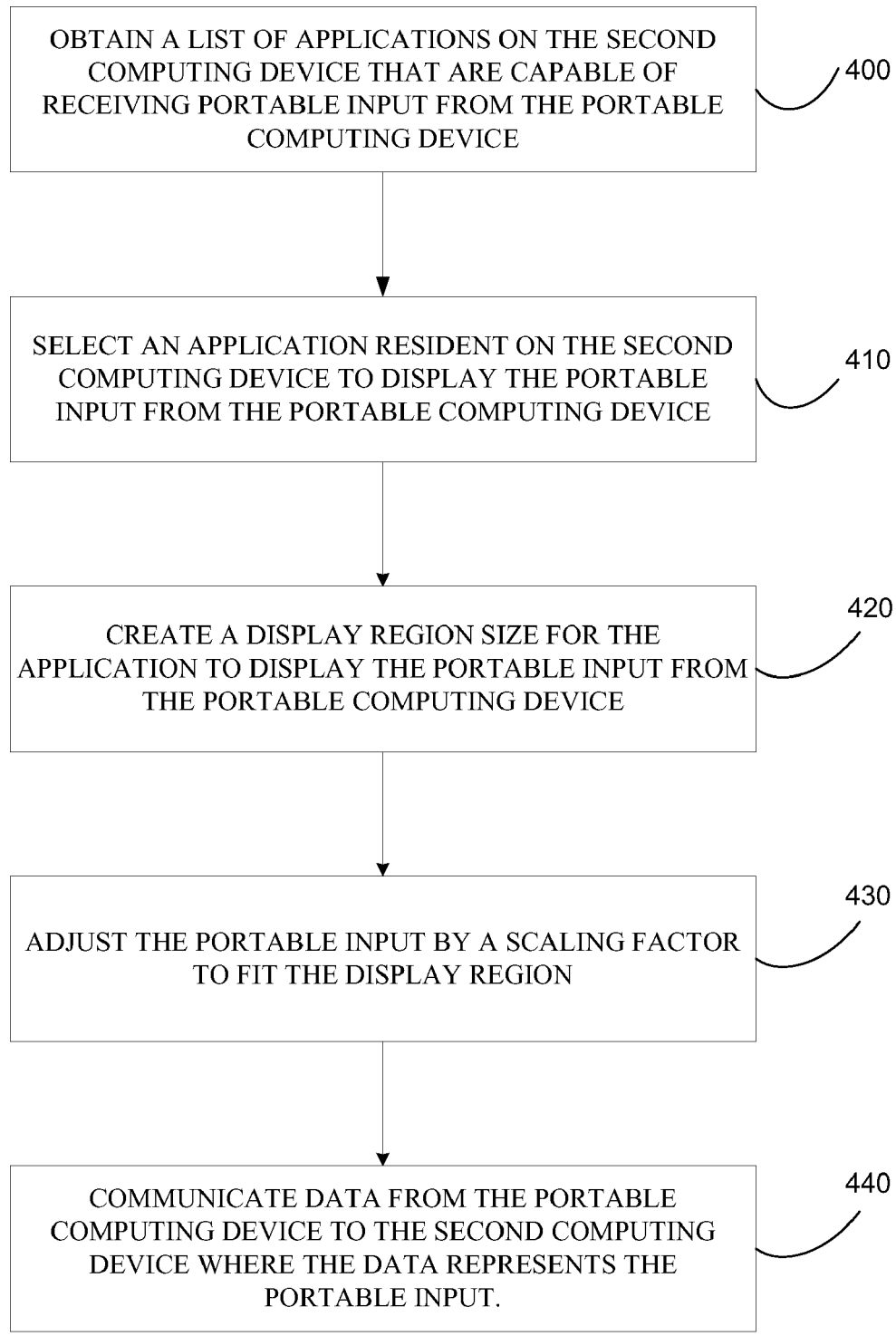
FIG. 4 is an illustration of a method of communicating input from a portable computing device to a second computing device.

FIG. 4 illustrates a method of communicating input from a portable computing device (e.g., device(s) 100) to a second computing device. At block 400, a list of applications on the second computing device can be obtained. In at least one embodiment, the applications may be capable of receiving portable input from the portable computing device.

At block 410, an application on the second computing device can be selected to display the portable input from the portable computing device. At block 420, a display region size can be created for the selected application to display the portable input from the portable computing device. At block 430 the portable input can be adjusted by a scaling factor to fit the display region.

At block 440, data representing the portable input can be communicated from the portable computing device to the second computing device.

Figure 5:
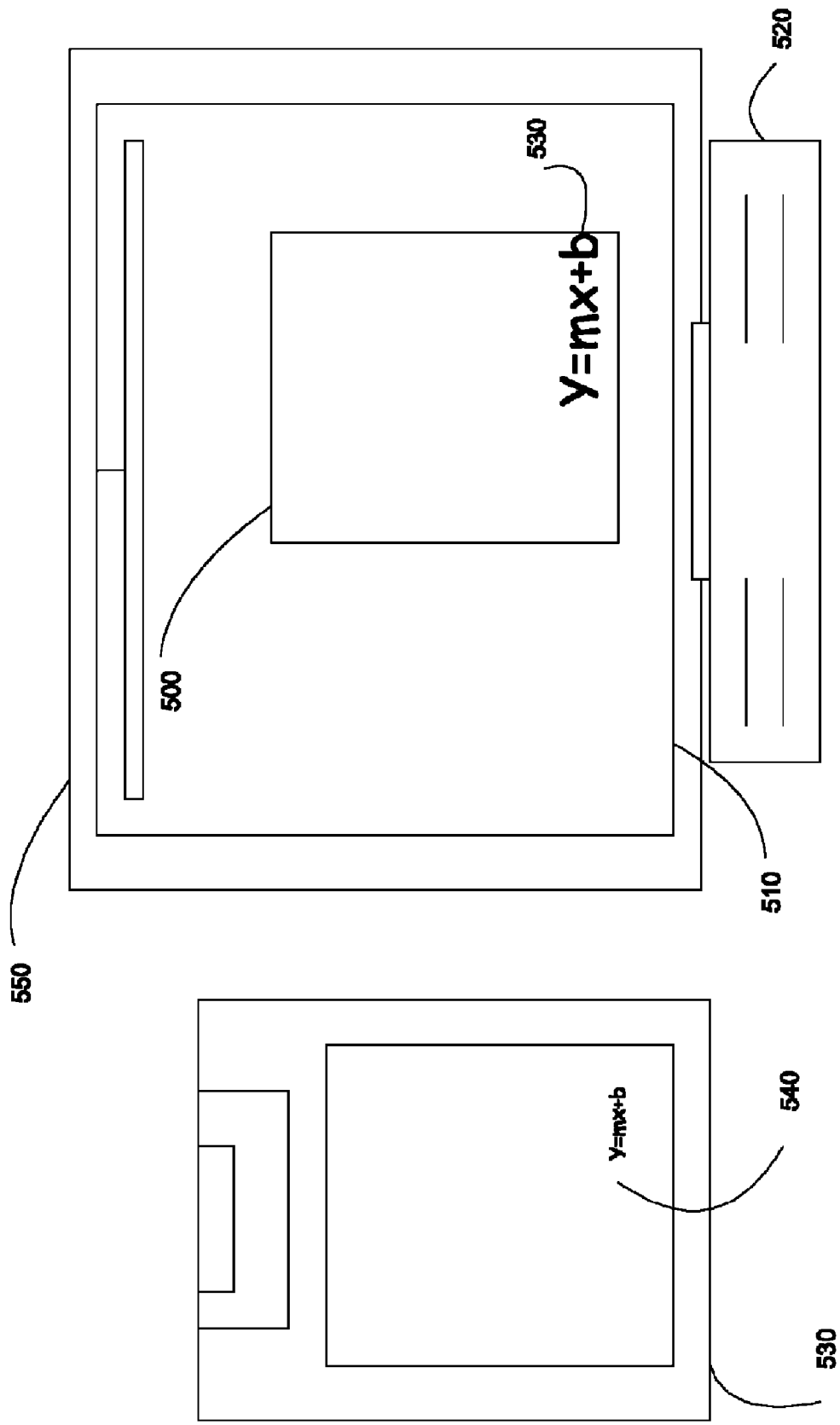
FIG. 5 is an illustration of a system in which the described embodiments may be implemented.

FIG. 5 illustrates a system that includes a computing device 520 associated with a display device (e.g., a monitor) 550 having a display 510 in which an input display region 500 is shown. Note that an input ("y=mx+b") is displayed at a display location 530 of the input display region 500 that is in the lower portion of the input display region 500. The system illustrated in FIG. 5 also includes a second computing device 530 (e.g., a portable computing device) that includes an input display region 540 in which the input ("y=mx+b") is displayed.

The invention claimed is:

1. A method of displaying inputted data from a portable computing device on a second computing device comprising:
    receiving an input begin signal from the portable computing device;
    receiving, at an input location on the second computing device, input from an input area on the portable computing device, wherein the input area is configured to communicate with a digitizing application for digitizing the input to the input area;
    storing the input in a memory;
    receiving an input end signal from the portable computing device;
    displaying the input at a display location on the second computing device without regard to the input location on the second computing device, wherein displaying the input comprises displaying the input in an input format used to enter the input on the portable computing device, and wherein the display location is below any other input displayed at one or more other display locations on the second computing device; and
    creating a space on the second computing device where additional input is displayable, wherein the created space is below the display location on the second computing device.

2. The method of claim 1, wherein the portable computing device comprises a surface configured to digitize the input on a first piece of paper that is in communication with the portable computing device.

3. The method of claim 2, further comprising:
communicating at a first time the input from the first piece of paper in communication with the portable computing device;
communicating at a second time an additional input from an additional piece of paper in communication with the portable computing device, wherein the second time is after the first time; and
displaying the additional input after the first input on an electronic page on the second computing device.

4. The method of claim 3, wherein the first piece of paper and the additional piece of paper are held in a bound notebook and the additional piece of paper is subsequent to the first piece of paper in the bound notebook.

5. The method of claim 3, wherein the first piece of paper and the additional piece of paper are held in a bound notebook and the additional piece of paper is previous to the first piece of paper in the bound notebook.

6. The method of claim 1, wherein the input begin signal continues for an input threshold amount of time.

7. The method of claim 1, wherein the input end signal stops for a stop threshold amount of time.

8. The method of claim 1, wherein the portable computing device and second computing device comprise a device configured to be separable into the portable computing device and the second computing device.

9. The method of claim 1, wherein the portable computing device and second computing device are configured to communicate via an interface.

10. A computer storage medium comprising computer executable code that, when executed, performs acts comprising:
receiving an input begin signal from a portable computing device;
receiving, from the portable computing device, an input at an input location on a second computing device, the input being inputted on the portable computing device in an input format, and wherein the portable computing device comprises an input area in communication with a digitizing application for digitizing the input to the input area;
storing the input in a memory;
receiving an input end signal from the portable computing device;
displaying, from the input begin signal to the input end signal, the input on the second computing device according to the input format; and
creating a space on the second computing device to display additional input below the input displayed on the second computing device.

11. The computer storage medium of claim 10, wherein the portable computing device comprises a surface that digitizes input on a piece of paper in communication with the portable computing device.

12. The computer storage medium of claim 11, the acts further comprising:
communicating at a first time the input from the piece of paper;
communicating at a second time an additional input from an additional piece of paper in communication with the portable computing device, wherein the second time is after the first time; and
displaying the input and the additional input on an electronic page on the second computing device, wherein the additional input is displayed after the input on the electronic page.

13. The computer storage medium of claim 12, wherein the piece of paper is subsequent to the additional piece of paper in a bound notebook.

14. The computer storage medium of claim 10, wherein the input begin signal continues for an input threshold amount of time and the input end signal stops for a stop threshold amount of time.

15. A computer system comprising a processor, a memory and an input/output circuit, the computer system comprising computer executable code that, when executed by the processor, perform acts comprising:
receiving an input begin signal from a portable computing device;
receiving, from the portable computing device, an input at an input location on a second computing device, the input being inputted on the portable computing device in an input format, wherein the portable computing device comprises an input area in communication with a digitizing application for digitizing the input to the input area;
storing the input in a memory;
receiving an input end signal from the portable computing device; and
displaying the input in the input format at a display location on the second computing device without regard to the input location on the second computing device, wherein the display location is below one or more other display locations on the second computing device where any other input is displayed.

16. The computer system of claim 15, further comprising:
displaying the input starting from the input begin signal to the input end signal as formatted input; and
creating a space below the display location where additional input is displayable.

17. The computer system of claim 15, wherein the portable computing device comprises a surface configured to digitize the input on a first piece of paper that is in communication with the portable computing device.

18. The computer system of claim 17, further comprising computer executable code for:
communicating, at a first time, the input from the first piece of paper in communication with the portable computing device;
communicating, at a second time, an additional input from an additional piece of paper in communication with the portable computing device, wherein the second time is after the first time; and
displaying the input and the additional input on an electronic page on the second computing device, wherein the additional input is displayed after the input on the electronic page.

19. The computer system of claim 18, wherein the additional piece of paper is subsequent to the first piece of paper in a bound notebook.

20. The computer system of claim 15, wherein the input begin signal continues for an input threshold amount of time and the input end signal stops for a stop threshold amount of time.

* * * * *